US012203002B2

(12) United States Patent
Stone et al.

(10) Patent No.: US 12,203,002 B2
(45) Date of Patent: Jan. 21, 2025

(54) SILICONE-BASED ELECTRODEPOSITABLE COATING COMPOSITION

(71) Applicant: PPG Industries Ohio, Inc., Cleveland, OH (US)

(72) Inventors: David A. Stone, Allison Park, PA (US); Jonathan A. Love, Natrona Heights, PA (US); Casey Sample, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/045,318

(22) Filed: Oct. 10, 2022

(65) Prior Publication Data

US 2023/0059457 A1  Feb. 23, 2023

Related U.S. Application Data

(63) Continuation of application No. 16/730,228, filed on Dec. 30, 2019, now Pat. No. 11,466,175.

(51) Int. Cl.
| | | |
|---|---|---|
| *C09D 183/12* | (2006.01) | |
| *C09D 5/24* | (2006.01) | |
| *C09D 183/06* | (2006.01) | |
| *C09D 183/08* | (2006.01) | |
| *C25D 13/04* | (2006.01) | |

(52) U.S. Cl.
CPC .......... *C09D 183/12* (2013.01); *C09D 5/24* (2013.01); *C09D 183/06* (2013.01); *C09D 183/08* (2013.01); *C25D 13/04* (2013.01)

(58) Field of Classification Search
CPC ...... C09D 183/12; C09D 5/24; C09D 183/06; C09D 183/08; C09D 133/06; C09D 125/14; C09D 183/10; C09D 133/14; C25D 13/04; C08G 77/442; C08L 25/08; C08L 33/064; C08L 33/068; C08L 83/04; C08L 2666/02; C08L 2666/04

See application file for complete search history.

(56) References Cited

U.S. PATENT DOCUMENTS

| | | | |
|---|---|---|---|
| 4,520,144 A | 5/1985 | Noren et al. | |
| 5,432,233 A | 7/1995 | Miyazoe et al. | |
| 5,441,995 A | 8/1995 | Ohgaki et al. | |
| 6,033,545 A | 3/2000 | Kaylo et al. | |
| 6,046,276 A | 4/2000 | Ambrose | |
| 6,657,001 B1 | 12/2003 | Anderson et al. | |
| 2005/0161337 A1 | 7/2005 | Byrd et al. | |
| 2014/0272435 A1 | 9/2014 | Dershem | |
| 2017/0335120 A1* | 11/2017 | Gelling | ............... C08G 59/066 |
| 2018/0334587 A1 | 11/2018 | Betzig | |

FOREIGN PATENT DOCUMENTS

| | | |
|---|---|---|
| CN | 103319691 A | 9/2013 |
| CN | 103911032 A | 7/2014 |
| CN | 103687918 B | 6/2016 |
| CN | 110128835 A | 8/2019 |
| SU | 663765 A1 | 5/1979 |
| WO | 2009045558 A2 | 4/2009 |
| WO | 2015090469 A1 | 6/2015 |
| WO | WO2015/164855 A1 | 10/2015 |

OTHER PUBLICATIONS

The International Search Report of the International Searching Authority for International Application No. PCT/US2020/067402, 5 pages.

* cited by examiner

*Primary Examiner* — Xiuyu Tai
(74) *Attorney, Agent, or Firm* — Diane R. Meyers

(57) ABSTRACT

The present invention is directed towards an electrodepositable coating composition comprising, consisting essentially of, or consisting of an ionic salt group-containing silicone-based main film-forming polymer comprising functional groups; and a curing agent reactive with the functional groups of the ionic salt group-containing silicone-based main film-forming polymer. Also disclosed are coatings, coated substrates, and methods of coating a substrate.

20 Claims, No Drawings

SILICONE-BASED ELECTRODEPOSITABLE COATING COMPOSITION

CROSS-REFERENCE TO RELATED APPLICATIONS

This application is a continuation of U.S. patent application Ser. No. 16/730,228, filed on Dec. 30, 2019, set to issue as U.S. Pat. No. 11,466,175, each of which are incorporated herein by reference.

FIELD OF THE INVENTION

The present invention is directed towards an electrodepositable coating composition comprising a silicone-based main film-forming polymer and a curing agent.

BACKGROUND INFORMATION

Electrodeposition as a coating application method involves the deposition of a film-forming composition onto a conductive substrate under the influence of an applied electrical potential. Electrodeposition has gained popularity in the coatings industry because it provides higher paint utilization, outstanding corrosion resistance, and low environmental contamination as compared with non-electrophoretic coating methods. Both cationic and anionic electrodeposition processes are used commercially. Organic binders are typically used in either anionic or cationic electrodeposition processes. These binder materials provide good barrier properties but can be susceptible to degradation by exposure to solvent. An electrodepositable coating composition that provides good barrier properties and resistance to solvent is desired.

SUMMARY OF THE INVENTION

Disclosed herein is an electrodepositable coating composition comprising an ionic salt group-containing silicone-based main film-forming polymer comprising functional groups; and a curing agent reactive with the functional groups of the ionic salt group-containing silicone-based main film-forming polymer.

Also disclosed herein is a method of coating a substrate comprising electrophoretically applying an electrodepositable coating composition comprising an ionic salt group-containing silicone-based main film-forming polymer comprising functional groups; and a curing agent reactive with the functional groups of the ionic salt group-containing silicone-based main film-forming polymer to at least a portion of the substrate and at least partially curing the coating composition to form an at least partially cured coating on the substrate.

Further disclosed herein are substrates coated with a coating deposited from an electrodepositable coating composition comprising an ionic salt group-containing silicone-based main film-forming polymer comprising functional groups; and a curing agent reactive with the functional groups of the ionic salt group-containing silicone-based main film-forming polymer.

Still further disclosed herein are at least partially cured coatings formed by at least partially curing a coating deposited from an electrodepositable coating composition comprising an ionic salt group-containing silicone-based main film-forming polymer comprising functional groups; and a curing agent reactive with the functional groups of the ionic salt group-containing silicone-based main film-forming polymer.

DETAILED DESCRIPTION OF THE INVENTION

As stated above, the present invention is directed to an electrodepositable coating composition comprising, consisting essentially of, or consisting of an ionic salt group-containing silicone-based main film-forming polymer comprising functional groups; and a curing agent reactive with the functional groups of the ionic salt group-containing silicone-based main film-forming polymer.

According to the present invention, the term "electrodepositable coating composition" refers to a composition that is capable of being deposited onto an electrically conductive substrate under the influence of an applied electrical potential.

As used herein, the term "silicone-based main film-forming polymer" refers to a polymer substantially comprising a main polymeric backbone chain comprising alternating silicon-oxygen bonding ($-Si(R)_2-O-Si(R)_2-$), wherein each R independently represents an organyl group. The ionic salt group-containing silicone-based main film forming polymer may comprise a polydiorganylsiloxane, and the organyl may comprise an alkyl group, aryl group, or combinations thereof. Accordingly, the ionic salt group-containing silicone-based main film forming polymer may comprise a polydialkylsiloxane polymer, a polydiarylsiloxane polymer, or combinations thereof, and such polymer may optionally be substituted with terminal or divalent organic groups in the main polymeric chain. For example, the ionic salt group-containing silicone-based main film forming polymer polymeric backbone chain may comprise one or more sections of a polydialkylsiloxane and/or one or more sections of a polydiarylsiloxane, as well as one or more sections of terminal or divalent organic groups. The alkyl groups of the polydialkylsiloxane polymer may comprise a $C_1$ to $C_4$ alkyl group. The polydialkylsiloxane polymer may comprise, for example, a polydimethylsiloxane polymer. The aryl groups of the polydiarylsiloxane polymer may comprise an aromatic ring having 6 to 12 carbon atoms in the ring. The polydiarylsiloxane polymer may comprise, for example, a polydiphenylsiloxane polymer. The alkyl and/or aryl groups may be substituted or unsubstituted.

As mentioned above, the sections of polydialkylsiloxane and/or polydiarylsiloxane may be joined by divalent organic groups. The divalent organic group may comprise a substituted or unsubstituted alkylene group, arylene group, cycloalkylene, cycloarylene, or a combination thereof. For example, the divalent organic group may comprise a substituted or unsubstituted alkylene group, a urethane group, a urea group, an ether group, an ester group, or combinations thereof.

The sections of polydiorganylsiloxane may comprise at least 25% by weight of the ionic salt group-containing silicone-based main film-forming polymer, such as at least 50% by weight, such as at least 70% by weight, such as at least 80% by weight, such as at least 85% by weight, such as at least 90% by weight, such as at least 95% by weight, such as at least 98% by weight, based on the total weight of the ionic salt group-containing silicone-based main film-forming polymer. The sections of polydiorganylsiloxane may comprise no more than 99% by weight of the ionic salt group-containing silicone-based main film-forming polymer, such as no more than 95% by weight, such as no more than 90% by weight, such as no more than 75% by weight, based on the total weight of the ionic salt group-containing silicone-based main film-forming polymer. The sections of polydiorganylsiloxane may comprise 25% to 99% by weight of the ionic salt group-containing silicone-based main film-forming polymer, such as 50% to 99% by weight, such as 70% to 99% by weight, such as 80% to 99% by weight, such as 85% to 99% by weight, such as 90% to 99% by weight, such as 95% to 99% by weight, such as 50% to 95% by weight, such as 70% to 95% by weight, such as 80% to 95% by weight, such as 85% to 95% by weight, such as 90% to 95% by weight, such as 50% to 90% by weight, such as 70% to 90% by weight, such as 80% to 90% by weight, such as 85% to 90% by weight, such as 90% to 90% by weight, based on the total weight of the ionic salt group-containing silicone-based main film-forming polymer.

The number average molecular weight of the ionic salt group-containing silicone-based main film-forming polymer may be at least 1,000 g/mol, such as at least 5,000 g/mol, such as at least 10,000 g/mol, such as at least 15,000 g/mol, such as at least 20,000 g/mol, such as at least 25,000 g/mol. The number average molecular weight of the ionic salt group-containing silicone-based main film-forming polymer may be no more than 100,000 g/mol, such as no more than 75,000 g/mol, such as no more than 60,000 g/mol, such as no more than 50,000 g/mol, such as no more than 40,000 g/mol, such as no more than 35,000 g/mol. The number average molecular weight of the ionic salt group-containing silicone-based main film-forming polymer may be from 1,000 to 100,000 g/mol, such as from 5,000 to 75,000 g/mol, such as from 10,000 to 60,000 g/mol, such as from 15,000 to 50,000 g/mol, such as from 20,000 to 40,000 g/mol, such as from 25,000 to 35,000 g/mol. As used herein, the term "number average molecular weight" or "$(M_n)$" means the number average molecular weight $(M_n)$ as determined by gel permeation chromatography (GPC) using polystyrene standards for calibration. The GPC determination can be performed using a Waters 2695 separation module with a Waters 410 differential refractometer (RI detector), linear polystyrene standards having molecular weights of from 580 Da to 365,000 Da, dimethylformamide (DMF) with 0.05M lithium bromide (LiBr) as the eluent at a flow rate of 0.5 mL/min, and one Shodex Asahipak GF-510 HQ column (300×7.5 mm, 5 μm) for separation.

As mentioned above, the ionic salt group-containing silicone-based main film-forming polymer comprises functional groups. The ionic salt group-containing silicone-based main film-forming polymer may comprise, for example, a hydroxyl functional group, an amino functional group, a thiol functional group, an epoxide functional group, an amide functional group, a carbamate functional group, a carboxylic acid group, a phosphorous acid group (such as a phosphonic acid group or a phosphinic acid group), a sulfonic acid group, or combinations thereof. At least a portion of these functional groups may be used to form the ionic salt groups. With the exception of the epoxide functional group and carbamate functional group, each of these functional groups may be considered to be active hydrogen-containing functional groups, and the ionic salt group-containing silicone-based main film-forming polymer may be considered to comprise active hydrogen functional groups when such groups are present. The functional groups may be pendant or terminal to the main polymeric backbone chain of the ionic salt group-containing silicone-based main film-forming polymer.

The ionic salt group-containing silicone-based main film-forming polymer may comprise the structure:

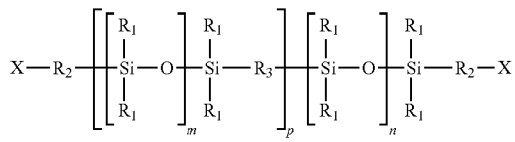

wherein each $R_1$ independently comprises, consists essentially of, or consists of a hydroxyl functional group, an amino functional group, a thiol functional group, an epoxide functional group, an amide functional group, a carbamate functional group, a carboxylic acid group, a phosphorous acid group, a sulfonic acid group, a $C_1$ to $C_4$ alkyl group, or an aryl group comprising an aromatic ring having 6 to 12 carbon atoms in the ring; each $R_2$ is optional and independently comprises, consists essentially of, or consists of oxygen, or a substituted or unsubstituted divalent organic group; each $R_3$ is optional and independently comprises, consists essentially of, or consists of a divalent organic group; each X independently comprises, consists essentially of, or consists of hydrogen, a hydroxyl functional group, an amino functional group, a thiol functional group, an epoxide functional group, an amide functional group, a carbamate functional group, a carboxylic acid group, a phosphorous acid group, a sulfonic acid group, an alkyl group, or an aryl group; m is an integer from 1 to 600; n is an integer from 1 to 600; and p is an integer from 0 to 600. At least a portion of the functional groups present in $R_1$, $R_2$, $R_3$, and/or X comprise ionic groups that may be used to form ionic salt groups.

The divalent organic group of $R_2$ may comprise an alkylene group, an arylene group, a cycloalkylene group, a cycloarylene group, or a combination thereof. The divalent organic group of $R_2$ may be substituted or unsubstituted.

The divalent organic group of $R_3$ may comprise, for example, a substituted or unsubstituted alkyl group, a urethane group, a urea group, an ether group, an ester group, or combinations thereof, and may optionally comprise other organic components. $R_3$ may be substituted with any of the functional groups above, including, for example, a hydroxyl functional group, an amino functional group, a thiol functional group, an epoxide functional group, an amide functional group, a carbamate functional group, a carboxylic acid group, a phosphorous acid group, a sulfonic acid group, or combinations thereof. For example, $R_3$ may comprise a substituted alkyl group having the structure:

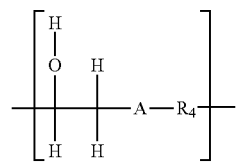

wherein A comprises oxygen or NH and $R_4$ comprises an optional divalent organic group. When A is oxygen, $R_3$ comprises the structure:

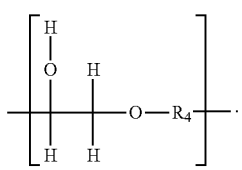

When A is NH, R₃ comprises the structure:

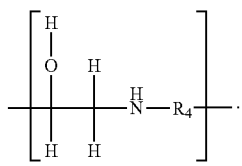

The optional functional group X may each independently comprise a hydroxyl functional group, an amino functional group, a thiol functional group, an epoxide functional group, an amide functional group, a carbamate functional group, a carboxylic acid group, a phosphorous acid group (such as phosphonic acid and phosphinic acid), a sulfonic acid group, or combinations thereof.

The ionic salt group-containing silicone-based main film-forming polymer may comprise a reaction product comprising the residue of functionalized silicone polymers. The functionalized silicone polymers may be mono-functional, di-functional, tri-functional, tetra-functional, or higher polyfunctional polymers. The use of di-functionalized silicone-based polymers allows for the production of linear polymers, and the use of tri-functionalized or higher polyfunctionalized polymers allows for the production of branched polymers. Mono-functionalized polymers may allow for control over the molecular weight of the resulting ionic salt group-containing silicone-based main film-forming polymer. The functionalized silicone-based polymers may be a functionalized polydiorganylpolysiloxane polymer, such as a functionalized polydialkylsiloxane or polydiarylsiloxane polymer. Non-limiting examples of functionalized silicone polymers include a thiol-functionalized silicone-based polymer, an epoxy-functionalized silicone-based polymer, an amine-functionalized silicone-based polymer, an amide-functionalized silicone-based polymer, a carbamate-functionalized silicone-based polymer, a carboxylic acid-functionalized silicone-based polymer, a phosphorous acid-functionalized silicone-based polymer, a sulfonic acid-functionalized silicone-based polymer, an isocyanato-functionalized silicone-based polymer, polyester-functionalized silicone-based polymer, anhydride-functionalized silicone-based polymer, (meth)acrylate-functionalized silicone-based polymer, or combinations thereof.

The functionalized silicone-based polymers may have a functional group theoretical equivalent weight of at least 100 g/equivalent, such as at least 200 g/equivalent, such as at least 250 g/equivalent, such as at least 300 g/equivalent, such as at least 350 g/equivalent. The functionalized silicone-based polymers may have a functional group theoretical equivalent weight of no more than 60,000 g/equivalent, such as no more than 20,000 g/equivalent, such as no more than 10,000 g/equivalent, such as no more than 3,000 g/equivalent, such as no more than 2,500 g/equivalent, such as no more than 2,000 g/equivalent, such as no more than 1,000 g/equivalent, such as no more than 600 g/equivalent. The functionalized silicone-based polymers may have a functional group theoretical equivalent weight of 100 to 60,000 g/equivalent, such as 100 to 20,000 g/equivalent, such as 100 to 10,000 g/equivalent, such as 100 to 3,000 g/equivalent, such as 100 to 2,500 g/equivalent, such as 200 to 2,500 g/equivalent, such as 250 to 2,000 g/equivalent, such as 300 to 1,000 g/equivalent, such as 350 to 600 g/equivalent. The theoretical equivalent weight may be determined by dividing the number average molecular weight by the theoretical number of functional groups per molecule of polymer. The theoretical equivalent weight may also be determined by dividing the total grams of resin used to make the polymer by the total theoretical equivalents of the functional group included in making the polymer.

A non-limiting example of the ionic salt group-containing silicone-based main film-forming polymer includes a reaction product comprising the residue of epoxy-functionalized silicone-based polymer and an amine-functionalized silicone-based polymer, such as a polydialkylsiloxane polyepoxy polymer, a polydiarylsiloxane polyepoxy polymer, or combination thereof, and a polydialkylsiloxane polyamine polymer, a polydiarylsiloxane polyamine polymer, or combination thereof. For example, the ionic salt group-containing silicone-based main film-forming polymer may comprise a linear polymer comprising the residue of a polydiorganyl siloxane di-epoxy polymer comprising terminal epoxide groups and a polydiorganyl siloxane di-amine polymer comprising terminal primary or secondary amino groups. The resulting ionic salt group-containing silicone-based main film-forming polymer would comprise terminal epoxy or primary or secondary amino groups (depending upon the molar ratio of the starting polymers), pendant hydroxyl groups, and secondary or tertiary amino groups in the main polymeric chain. The ratio of amino functional groups from the amine-functionalized silicone-based polymer to epoxide functional groups from the epoxy-functionalized silicone-based polymer may be from 0.5:1 to 2:1, such as 1:1 to 1.8:1, such as 1.2:1 to 1.7:1, such as 1.4:1 to 1.5:1.

The ionic salt group-containing silicone-based main film-forming polymer may also comprise a silicone-based polymer reacted with an organic polymer, an inorganic polymer, or combinations thereof. For example, a functionalized silicone-based polymer may comprise functional groups reactive with functional groups present in an organic polymer and/or an inorganic polymer to form a silicone-based main film-forming polymer comprising at least one section of polydiorganylsiloxane units and the residue of an organic and/or inorganic polymer. As noted above, sections of polydiorganylsiloxane may comprise at least 25% by weight of the resulting silicone-based main film-forming polymer, based on the total weight of the silicone-based main film-forming polymer. A non-limiting specific example includes the reaction of an amino, hydroxyl, carboxylic acid, or epoxide-functional silicone-based polymer with bisphenol A, bisphenol F, or an di-glycidyl ether of bisphenol A or bisphenol F.

The ionic salt group-containing silicone-based main film-forming polymer further comprises ionic salt groups such that is comprises an ionic salt group-containing silicone-based main film-forming polymer. The ionic salt groups may include cationic salt groups which are cationic ionic groups (i.e., basic groups) located within the polymer that are at least partially neutralized (i.e., protonated) by an acid or anionic salt groups which are anionic ionic groups (i.e., acid groups) located within the polymer that are at least partially neutralized with a base. Accordingly, the ionic salt group-containing silicone-based main film-forming polymer may comprise a cationic salt group-containing silicone-based main film-forming polymer or an anionic salt group-containing silicone-based main film-forming polymer.

According to the present invention, the ionic salt group-containing silicone-based main film-forming polymer may comprise a cationic salt group containing silicone-based main film-forming polymer. The cationic salt group-containing silicone-based main film-forming polymer may be used in a cationic electrodepositable coating composition. As used herein, the term "cationic salt group-containing silicone-based main film-forming polymer" refers to polymers that include at least partially neutralized cationic groups, such as, but not limited to, sulfonium groups and ammonium groups, that impart a positive charge.

The cationic salt group-containing silicone-based main film-forming polymer may be made cationic and water dispersible by at least partial neutralization with an acid. As used herein, the term "water-dispersible" means that a material is adapted to be solubilized, dispersed, and/or emulsified in water. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

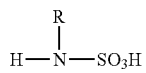

wherein R is hydrogen or an alkyl group having 1 to 4 carbon atoms. Mixtures of the above-mentioned acids also may be used in the present invention.

The extent of neutralization of the cationic salt group-containing silicone-based main film-forming polymer may vary. However, sufficient acid should be used to sufficiently neutralize the cationic salt-group containing silicone-based main film-forming polymer such that the cationic salt-group containing silicone-based main film-forming polymer may be dispersed in an aqueous dispersing medium. For example, the amount of acid used may provide at least 20% of all of the total theoretical neutralization. Excess acid may also be used beyond the amount required for 100% total theoretical neutralization. For example, the amount of acid used to neutralize the cationic salt group-containing silicone-based main film-forming polymer may be ≥0.1% based on the total cationic groups in the cationic salt group-containing silicone-based main film-forming polymer. Alternatively, the amount of acid used to neutralize the cationic salt group-containing silicone-based main film-forming polymer may be 100% based on the total cationic groups in the cationic salt group-containing silicone-based main film-forming polymer. The total amount of acid used to neutralize the cationic salt group-containing silicone-based main film-forming polymer may range between any combination of values, which were recited in the preceding sentences, inclusive of the recited values. For example, the total amount of acid used to neutralize the cationic salt group-containing silicone-based main film-forming polymer may be 20%, 35%, 50%, 60%, or 80% based on the total cationic groups in the polymer.

According to the present invention, the cationic salt group-containing silicone-based main film-forming polymer may be present in the cationic electrodepositable coating composition in an amount of at least 40% by weight, such as at least 50% by weight, such as at least 60% by weight, and may be present in the in an amount of no more than 99% by weight, such as no more than 90% by weight, such as no more than 80% by weight, such as no more than 75% by weight, based on the total weight of the resin solids of the electrodepositable coating composition. The cationic salt group-containing silicone-based main film-forming polymer may be present in the cationic electrodepositable coating composition in an amount of 40% to 99% by weight, such as 40% to 90% by weight, such as 50% to 80% by weight, such as 60% to 75% by weight, based on the total weight of the resin solids of the electrodepositable coating composition.

According to the present invention, the ionic salt group-containing film-forming polymer may comprise an anionic salt group containing silicone-based main film-forming polymer. The anionic salt group-containing silicone-based main film-forming polymer may be used in an anionic electrodepositable coating composition. As used herein, the term "anionic salt group-containing silicone-based main film-forming polymer" refers to polymers that include at least partially neutralized anionic groups, such as, but not limited to, carboxylic acid, sulfonic acid, and phosphorous acid groups, that impart a negative charge.

The anionic salt group-containing silicone-based main film-forming polymer may be made anionic and water dispersible by at least partial neutralization with a base. Non-limiting examples of suitable bases include both organic and inorganic bases. Illustrative examples of suitable bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholines, e.g., N-methylmorpholine or N-ethylmorpholine. The percent of neutralization is such as would make the polymer water-dispersible and electrodepositable. One or more of such bases may be added to the anionic salt group-containing silicone-based main film-forming polymer in an amount sufficient to theoretically neutralize the anionic salt group-containing silicone-based main film-forming polymer from, for example, 20% to 200%, such as 40% to 150%, such as 60% to 120% of theoretical neutralization of the total number of anionic groups.

According to the present invention, the anionic salt group-containing silicone-based main film-forming polymer may be present in the anionic electrodepositable coating composition in an amount of at least 40% by weight, such as at least 50% by weight, such as at least 55% by weight, such as at least 60% by weight, and may be present in an amount of no more than 99% by weight, such as no more than 90% by weight, such as no more than 80% by weight, such as no more than 75% by weight, based on the total weight of the resin solids of the electrodepositable coating composition. The anionic salt group-containing silicone-based main film-forming polymer may be present in the anionic electrodepositable coating composition in an amount 40% to 99% by weight, such as 50% to 90% by weight, such as 55% to 80% by weight, such as 60% to 75% by weight, based on the total weight of the resin solids of the electrodepositable coating composition.

According to the present invention, the electrodepositable coating composition of the present invention may further comprise a curing agent reactive with the functional groups of the ionic salt group-containing silicone-based main film-forming polymer. The curing agent reacts with the reactive functional groups of the ionic salt group-containing film-forming polymer to effectuate cure of the coating composition to form a coating. As used herein, the term "cure", "cured" or similar terms, as used in connection with the electrodepositable coating compositions described herein, means that at least a portion of the components that form the electrodepositable coating composition are crosslinked to form a coating. Additionally, curing of the electrodepositable coating composition refers to subjecting said composition to curing conditions (e.g., elevated temperature) leading to the reaction of the reactive functional groups of the components of the electrodepositable coating composition, and resulting in the crosslinking of the components of the composition and formation of an at least partially cured coating. Non-limiting examples of suitable curing agents include conventional curing agents known in the art such as at least partially blocked polyisocyanates, aminoplast resins and phenoplast resins, such as phenolformaldehyde condensates including allyl ether derivatives thereof. Alternatively, or in addition to, the curing agent may comprise, consist essentially of, or consist of a silicone-based curing agent, such as, for example, a silicone-based at least partially blocked polyisocyanate, a silicone-based aminoplast resin, a silicone-based phenoplast resin, or combinations thereof.

As used herein, a "silicone-based curing agent" refers to a compound substantially comprising a chain comprising alternating silicon-oxygen bonding (—Si(R)$_2$—O—Si(R)$_2$—), wherein each R independently represents an organic group, and functional groups that are reactive with functional groups present on the silicone-based main film-forming polymer. The silicone-based curing agent may comprise at least two such functional groups, such as at least three functional groups, or more. For example, the silicone-based curing agent may comprise a main backbone of polydiorganylsiloxane sections substituted with pendant and/or terminal functional groups reactive with the functional groups present in the silicone-based main film-forming polymer. Non-limiting examples of such functional groups include isocyanato groups that may be at least partially blocked or fully blocked with the blocking agents described herein, methylol or similar alkylol groups, or combinations thereof. The sections of polydiorganylsiloxane may comprise at least 25% by weight of the silicone-based curing agent, such as at least 50% by weight, such as at least 70% by weight, such as at least 80% by weight, such as at least 85% by weight, such as at least 90% by weight, such as at least 95% by weight, such as at least 98% by weight, based on the total weight of the silicone-based curing agent. The sections of polydiorganylsiloxane may comprise no more than 99% by weight of the silicone-based curing agent, such as no more than 95% by weight, such as no more than 90% by weight, such as no more than 75% by weight, based on the total weight of the silicone-based curing agent. The sections of polydiorganylsiloxane may comprise 25% to 99% by weight of the silicone-based curing agent, such as 50% to 99% by weight, such as 70% to 99% by weight, such as 80% to 99% by weight, such as 85% to 99% by weight, such as 90% to 99% by weight, such as 95% to 99% by weight, such as 50% to 95% by weight, such as 70% to 95% by weight, such as 80% to 95% by weight, such as 85% to 95% by weight, such as 90% to 95% by weight, such as 50% to 90% by weight, such as 70% to 90% by weight, such as 80% to 90% by weight, such as 85% to 90% by weight, based on the total weight of the silicone-based curing agent.

A non-limiting exemplary method of preparing a silicone-based curing agent may include reacting a di-amino terminated polydiorganylsiloxane with a cyclic carbonate ester to form a silicone-based blocked polyisocyanate curing agent. For example, as shown in the examples below, a 3-aminopropyl terminated polydimethylsiloxane may be reacted with propylene carbonate to form a silicone-based blocked polyisocyanate curing agent.

Suitable conventional at least partially blocked polyisocyanates include aliphatic polyisocyanates, aromatic polyisocyanates, and mixtures thereof. The curing agent may comprise an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which is incorporated herein by reference, or partially blocked aliphatic polyisocyanates that are reacted with the polymer backbone, such as is described in U.S. Pat. No. 3,947,338 at col. 2 line 65 to col. 4 line 30, this portion of which is also incorporated herein by reference. By "blocked" is meant that the isocyanate groups have been reacted with a compound such that the resultant blocked isocyanate group is stable to active hydrogens at ambient temperature but reactive with active hydrogens in the film forming polymer at elevated temperatures, such as between 90° C. and 200° C. The polyisocyanate curing agent may be a fully blocked polyisocyanate with substantially no free isocyanate groups.

The polyisocyanate curing agent may comprise a diisocyanate, higher functional polyisocyanates or combinations thereof. For example, the polyisocyanate curing agent may comprise aliphatic and/or aromatic polyisocyanates. Aliphatic polyisocyanates may include (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexmethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4, 4',4"-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. The curing agent may comprise a blocked polyisocyanate selected from a polymeric polyisocyanate, such as polymeric HDI, polymeric MDI, polymeric isophorone diisocyanate, and the like. The curing agent may also comprise a blocked trimer of hexamethylene diisocyanate available as Desmodur N3300® from Covestro AG. Mixtures of polyisocyanate curing agents may also be used.

The polyisocyanate curing agent may be at least partially blocked with at least one blocking agent selected from a 1,2-alkane diol, for example 1,2-propanediol; a 1,3-alkane diol, for example 1,3-butanediol; a benzylic alcohol, for example, benzyl alcohol; an allylic alcohol, for example, allyl alcohol; caprolactam; a dialkylamine, for example dibutylamine; and mixtures thereof. The polyisocyanate curing agent may be at least partially blocked with at least one 1,2-alkane diol having three or more carbon atoms, for example 1,2-butanediol.

Other suitable blocking agents include aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

The curing agent may comprise an aminoplast resin. Aminoplast resins are condensation products of an aldehyde with an amino- or amido-group carrying substance. Condensation products obtained from the reaction of alcohols and an aldehyde with melamine, urea or benzoguanamine may be used. However, condensation products of other amines and amides may also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. Suitable aldehydes include formaldehyde, acetaldehyde, crotonaldehyde, acrolein, benzaldehyde, furfural, glyoxal and the like.

The aminoplast resins may contain methylol or similar alkylol groups, and at least a portion of these alkylol groups may be etherified by a reaction with an alcohol to provide organic solvent-soluble resins. Any monohydric alcohol may be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cello solves and Carbitols, and halogen-substituted or other substituted alcohols, such as 3-chloropropanol and butoxyethanol.

Non-limiting examples of commercially available aminoplast resins are those available under the trademark CYMEL® from Allnex Belgium SA/NV, such as CYMEL 1130 and 1156, and RESIMENE® from INEOS Melamines, such as RESIMENE 750 and 753. Examples of suitable aminoplast resins also include those described in U.S. Pat. No. 3,937,679 at col. 16, line 3 to col. 17, line 47, this portion of which being hereby incorporated by reference. As is disclosed in the aforementioned portion of the '679 patent, the aminoplast may be used in combination with the methylol phenol ethers.

Phenoplast resins are formed by the condensation of an aldehyde and a phenol. Suitable aldehydes include formaldehyde and acetaldehyde. Methylene-releasing and aldehyde-releasing agents, such as paraformaldehyde and hexamethylene tetramine, may also be utilized as the aldehyde agent. Various phenols may be used, such as phenol itself, a cresol, or a substituted phenol in which a hydrocarbon radical having either a straight chain, a branched chain or a cyclic structure is substituted for a hydrogen in the aromatic ring. Mixtures of phenols may also be employed. Some specific examples of suitable phenols are p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain.

Aminoplast and phenoplast resins, as described above, are described in U.S. Pat. No. 4,812,215 at col.6, line 20 to col. 7, line 12, the cited portion of which being incorporated herein by reference.

The curing agent may be present in the cationic electrodepositable coating composition in an amount of at least 1% by weight, such as at least 10% by weight, such as at least 20% by weight, such as at least 25% by weight, and may be present in an amount of no more than 60% by weight, such as no more than 50% by weight, such as no more than 40% by weight, based on the total weight of the resin solids of the electrodepositable coating composition. The curing agent may be present in the cationic electrodepositable coating composition in an amount of 1% to 60% by weight, such as 10% to 60% by weight, such as 20% to 50% by weight, such as 25% to 40% by weight, based on the total weight of the resin solids of the electrodepositable coating composition.

The curing agent may be present in the anionic electrodepositable coating composition in an amount of at least 1% by weight, such as at least 10% by weight, such as at least 20% by weight, such as at least 25% by weight, and may be present in an amount of no more than 50% by weight, such as no more than 45% by weight, such as no more than 40% by weight, based on the total weight of the resin solids of the electrodepositable coating composition. The curing agent may be present in the anionic electrodepositable coating composition in an amount of 1% to 50% by weight, such as 10% to 50% by weight, such as 20% to 45% by weight, such as 25% to 40% by weight, based on the total weight of the resin solids of the electrodepositable coating composition.

The electrodepositable coating composition according to the present invention may optionally comprise one or more further components in addition to the ionic salt group-containing silicone-based main film-forming polymer and the curing agent described above.

According to the present invention, the electrodepositable coating composition may optionally comprise a catalyst to catalyze the reaction between the curing agent and the polymers. Examples of catalysts suitable for cationic electrodepositable coating compositions include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate); or a cyclic guanidine as described in U.S. Pat. No. 7,842,762 at col. 1, line 53 to col. 4, line 18 and col. 16, line 62 to col. 19, line 8, the cited portions of which being incorporated herein by reference. Examples of catalysts suitable for anionic electrodepositable coating compositions include latent acid catalysts, specific examples of which are identified in WO 2007/118024 at [0031] and include, but are not limited to, ammonium hexafluoroantimonate, quaternary salts of $SbF_6$ (e.g., NACURE® XC-7231), t-amine salts of $SbF_6$ (e.g., NACURE® XC-9223), Zn salts of triflic acid (e.g., NACURE® A202 and A218), quaternary salts of triflic acid (e.g., NACURE® XC-A230), and diethylamine salts of triflic acid (e.g., NACURE® A233), all commercially available from King Industries, and/or mixtures thereof. Latent acid catalysts may be formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts may be activated by heating among other mechanisms.

Other optional ingredients that may be included in the electrodepositable coating composition include a pigment composition and various additives such as fillers, plasticizers, anti-oxidants, biocides, UV light absorbers and stabilizers, hindered amine light stabilizers, defoamers, fungicides, dispersing aids, flow control agents, surfactants, wetting agents, or combinations thereof. Alternatively, the electrodepositable coating composition may be substantially free, essentially free, or completely free of any of the optional ingredients. The pigment composition may comprise, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion may be expressed as the pigment-to-resin weight ratio and may be within the range of 0.03 to 0.6, when pigment is used. The other additives mentioned above may be present in the electrodepositable coating composition in amounts of 0.01% to 3% by weight, based on total weight of the resin solids of the electrodepositable coating composition.

According to the present invention, the electrodepositable coating composition may comprise water and/or one or more organic solvent(s). Water can for example be present in amounts of 40% to 90% by weight, such as 50% to 75% by weight, based on total weight of the electrodepositable coating composition. Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic solvents may typically be present in an amount of less than 10% by weight, such as less than 5% by weight, based on total weight of the electrodepositable coating composition. The electrodepositable coating composition may in particular be provided in the form of a dispersion, such as an aqueous dispersion.

According to the present invention, the total solids content of the electrodepositable coating composition may be at least 1% by weight, such as at least 5% by weight, and may be no more than 50% by weight, such as no more than 40% by weight, such as no more than 35% by weight, such as no more than 20% by weight, based on the total weight of the electrodepositable coating composition. The total solids content of the electrodepositable coating composition may be from 1% to 50% by weight, such as 5% to 40% by weight, such as 5% to 35% by weight, such as 5% to 20% by weight, based on the total weight of the electrodepositable coating composition. As used herein, "total solids" refers to the non-volatile content of the electrodepositable coating composition, i.e., materials which will not volatilize when the composition is heated to 110° C. for 15 minutes.

According to the present invention, the electrodepositable coating composition may be deposited onto an electrically conductive substrate under the influence of an applied electrical potential. The electrodepositable coating composition may be electrodeposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 2XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091.

The substrate optionally may be a non-fibrous substrate. As used herein, the term "non-fibrous substrate" means a substrate that does not include individual fibers or a fabric of fibers.

The present invention is also directed to methods for coating a substrate, such as any one of the substrates mentioned above. According to the present invention such method may comprise electrophoretically applying a coating from the electrodepositable coating composition as described above to at least a portion of the substrate and curing the coating composition to form an at least partially cured coating on the substrate. According to the present invention, the method may comprise (a) electrophoretically depositing onto at least a portion of the substrate a coating from an electrodepositable coating composition of the present invention and may further comprise (b) heating the coated substrate to a temperature and for a time sufficient to cure the electrodeposited coating on the substrate.

According to the present invention, the method may optionally further comprise (c) applying directly to the at least partially cured electrodeposited coating one or more pigment-containing coating compositions and/or one or more pigment-free coating compositions to form a topcoat over at least a portion of the at least partially cured electrodeposited coating, and (d) heating the coated substrate of step (c) to a temperature and for a time sufficient to cure the top coat.

According to the present invention, the cationic electrodepositable coating composition of the present invention may be deposited upon an electrically conductive substrate by placing the composition in contact with an electrically conductive cathode and an electrically conductive anode, with the surface to be coated being the cathode. Following contact with the composition, an adherent film of the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the cationic electrodepositable coating composition is electrodeposited over at least a portion of the electroconductive substrate, the coated substrate is heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 250° F. to 450° F. (121.1° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, the film thickness of the electrodeposited coating, level and type of catalyst present in the composition and the like. For purposes of the present invention, all that is necessary is that the time be sufficient to effect cure of the coating on the substrate. For example, the curing time can range from 10 minutes to 60 minutes, such as 20 to 40 minutes. The thickness of the resultant cured electrodeposited coating may range from 15 to 50 microns.

According to the present invention, the anionic electrodepositable coating composition of the present invention may be deposited upon an electrically conductive substrate by placing the composition in contact with an electrically conductive cathode and an electrically conductive anode, with the surface to be coated being the anode. Following contact with the composition, an adherent film of the coating composition is deposited on the anode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the anionic electrodepositable coating composition is electrodeposited over at least a portion of the electroconductive substrate, the coated substrate may be heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time may range from 10 to 60 minutes, such as 20 to 40 minutes. The thickness of the resultant cured electrodeposited coating may range from 15 to 50 microns.

The electrodepositable coating compositions of the present invention may also, if desired, be applied to a substrate using non-electrophoretic coating application techniques, such as flow, dip, spray and roll coating applications. For non-electrophoretic coating applications, the coating compositions may be applied to conductive substrates as well as non-conductive substrates such as glass, wood and plastic.

The present invention is further directed to a coating deposited from the electrodepositable coating composition described herein. The coating may be in an at least partially cured state.

The present invention is further directed to a substrate that is coated, at least in part, with a coating deposited from the electrodepositable coating composition described herein. The coating may be in an at least partially cured state.

As used herein, the "resin solids" include the ionic salt group-containing silicone-based main film-forming polymer, the curing agent, and any additional water-dispersible non-pigmented component(s) present in the electrodepositable coating composition.

As used herein, the term "polymer" encompasses, but is not limited to, oligomers and both homopolymers and copolymers.

As used herein, unless otherwise defined, the term "substantially free" means that a component is present in the electrodepositable composition, if at all, in an amount less than 1% by weight, based on the total weight of the resin solids of the composition.

As used herein, unless otherwise defined, the term "essentially free" means that a component is present in the electrodepositable composition, if at all, in an amount less than 0.1% by weight, based on the total weight of the resin solids of the composition.

As used herein, unless otherwise defined, the term "completely free" means that a component is not present in the electrodepositable composition, i.e., 0.00% by weight, based on the total weight of the resin solids of the composition.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" polydialkylsiloxane polymer, "a" polydiarylsiloxane polymer, and "a" curing agent, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

In view of the foregoing, the present invention thus relates in particular, without being limited thereto, to the following aspects:

1. An electrodepositable coating composition comprising: an ionic salt group-containing silicone-based main film-forming polymer comprising functional groups; and a curing agent reactive with the functional groups of the ionic salt group-containing silicone-based main film-forming polymer.

2. The electrodepositable coating composition of Aspect 1, wherein the ionic salt group-containing silicone-based main film-forming polymer comprises a main polymeric backbone chain comprising sections of polydiorganylsiloxane comprising alternating silicon-oxygen bonding (—Si(R)$_2$—O—Si(R)$_2$—), wherein each R independently represents an organyl group.

3. The electrodepositable coating composition of Aspect 2, wherein the sections of polydiorganylsiloxane comprise 25% to 99% by weight of the ionic salt group-containing silicone-based main film-forming polymer, such as 50% to 97% by weight or 70% to 95% by weight or 80% to 93% by weight or 85% to 90% by weight, each based on the total weight of the ionic salt group-containing silicone-based main film-forming polymer.

4. The electrodepositable coating composition of Aspect 3, wherein the ionic salt group-containing silicone-based main film-forming polymer comprises one or more sections of a polydialkylsiloxane such as polydimethylsiloxane and/or one or more sections of a polydiarylsiloxane.

5. The electrodepositable coating composition of Aspect 4, wherein at least two sections of polydialkylsiloxane and/or polydiarylsiloxane are joined by a divalent organic group such as a substituted or unsubstituted alkyl group that can be interrupted by —O— or —NH—, a urethane group, a urea group, an ether group, an ester group, or combinations thereof.

6. The electrodepositable coating composition of any one Aspects 1 to 3, wherein the ionic salt group-containing silicone-based main film-forming polymer comprises a polydialkylsiloxane polymer, a polydiarylsiloxane polymer, or combinations thereof.

7. The electrodepositable coating composition of any one of Aspects 1 to 6, wherein the ionic salt group-containing silicone-based main film-forming polymer is a cationic group-containing silicone-based main film-forming polymer.

8. The electrodepositable coating composition of Aspect 7, wherein cationic groups are selected from ammonium groups, sulfonium groups, and combinations thereof.

9. The electrodepositable coating composition of any one of Aspects 1 to 6, wherein the ionic salt group-containing silicone-based main film-forming polymer is an anionic salt group-containing silicone-based main film-forming polymer.

10. The electrodepositable coating composition of Aspect 9, wherein anionic groups are selected from carboxylic acid groups, sulfonic acid groups, phosphonic acid groups, phosphinic acid groups, and combinations thereof.

11. The electrodepositable coating composition of any one of Aspects 1 to 10, wherein the functional groups of the ionic salt group-containing silicone-based main film-forming polymer are selected from hydroxyl functional groups, amino functional groups, thiol functional groups, epoxide functional group, amide functional groups, carbamate functional groups, or combinations thereof.

12. The electrodepositable coating composition of any one of Aspects 1 to 11, wherein the ionic salt group-containing silicone-based main film-forming polymer comprises active hydrogen functional groups.

13. The electrodepositable coating composition of Aspect 12, wherein the ionic salt group-containing silicone-based main film-forming polymer comprises cationic groups.

14. The electrodepositable coating composition of any one of Aspects 1 to 13, wherein the ionic salt group-containing silicone-based main film-forming polymer comprises the structure:

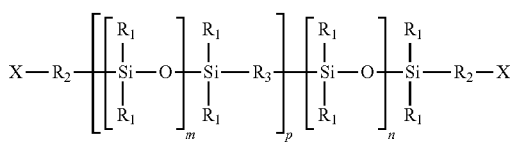

wherein each $R_1$ independently comprises a hydroxyl functional group, an amino functional group that can be protonated, a thiol functional group, an epoxide functional group, an amide functional group, a carbamate functional group, a carboxylic acid group, a phosphonic acid group, a phosphinic acid group, a sulfonic acid group, a $C_1$ to $C_4$ alkyl group, or an aryl group comprising an aromatic ring having 6 to 12 carbon atoms in the ring; each $R_2$ independently comprises oxygen, or a substituted or unsubstituted divalent organic group; each $R_3$ is optional and independently comprises a divalent organic group; each X independently comprises hydrogen, a hydroxyl functional group, an amino functional group that can be protonated, a thiol functional group, an epoxide functional group, an amide functional group, a carbamate functional group, a carboxylic acid group, a phosphonic acid group, a phosphinic acid group, a sulfonic acid group, an alkyl group, or an aryl group; m is an integer from 1 to 600; n is an integer from 1 to 600; and p is an integer from 0 to 600, and provided that carboxylic acid groups, phosphonic acid groups, phosphinic acid groups, and/or sulfonic acid groups, or protonated amino groups are present.

15. The electrodepositable coating composition of Aspect 14, wherein $R_3$ comprises:

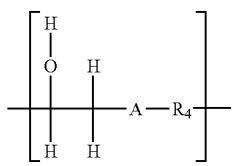

wherein A is oxygen or NH and $R_4$ comprises an optional divalent organic group.

16. The electrodepositable coating composition of Aspect 15, wherein the ionic salt group-containing silicone-based main film-forming polymer comprises the residue of an epoxy-functionalized silicone-based polymer and an amine-functionalized silicone-based polymer.

17. The electrodepositable coating composition of any one Aspect 15 or Aspect 16, wherein the ionic salt group-containing silicone-based main film-forming polymer comprises the reaction product of an epoxy-functionalized silicone-based polymer and an amine-functionalized silicone-based polymer.

18. The electrodepositable coating composition of Aspect 17, wherein the ionic salt group-containing silicone-based main film-forming polymer comprises the reaction product of an epoxy-functionalized polydialkylsiloxane polymer, such as an epoxy-functionalized polydimethylsiloxane polymer, and an amine-functionalized polydialkylsiloxane polymer, such as an amine-functionalized polydimethylsiloxane polymer.

19. The electrodepositable coating composition of any one of Aspects 16 to 18, wherein the epoxy-functionalized silicone-based polymer has an epoxy equivalent weight of 100 g/epoxy to 3,000 g/epoxy.

20. The electrodepositable coating composition of any one of Aspects 16 to 19, wherein the amine-functionalized silicone-based polymer has an amine equivalent weight of 100 g/amine to 2,500 g/amine.

21. The electrodepositable coating composition of any one of Aspects 16 to 20, wherein ratio of amino functional groups from the amine-functionalized silicone-based polymer to epoxy functional groups from the epoxy-functionalized silicone-based polymer is within the range from 0.5:1 to 2:1.

22. The electrodepositable coating composition of Aspect 21, wherein ratio of amino functional groups from the amine-functionalized silicone-based polymer to epoxy functional groups from the epoxy-functionalized silicone-based polymer is within the range form 1:1 to 1.8:1 such as 1.2:1 to 1.7:1 or 1.4:1 to 1.5:1.

23. The electrodepositable coating composition of any one of Aspects 1 to 22, wherein the curing agent comprises functional groups reactive with active hydrogen functional groups.

24. The electrodepositable coating composition of any one of Aspects 1 to 23, wherein the curing agent comprises an at least partially blocked polyisocyanate, an aminoplast resin, a phenoplast resin, or combinations thereof.

25. The electrodepositable coating composition of any one of Aspects 1 to 24, wherein the curing agent comprises a silicone-based curing agent comprising a chain comprising alternating silicon-oxygen bonding (—Si(R)$_2$—O—Si(R)$_2$ —), wherein each R independently represents an organic group.

26. The electrodepositable coating composition of any one of Aspect 24 or Aspect 25, wherein the curing agent comprises a silicone-based at least partially blocked polyisocyanate, a silicone-based aminoplast resin, a silicone-based phenoplast resin, or combinations thereof.

27. The electrodepositable coating composition of Aspect 26, wherein the silicone-based at least partially blocked polyisocyanate comprises a polydimethylsiloxane-based at least partially blocked polyisocyanate.

28. The electrodepositable coating composition of any one of Aspects 1 to 27, wherein the ionic salt group-containing silicone-based main film-forming polymer is present in an amount of 40% to 99% by weight, such as 40% to 90% by weight or 50% to 80% by weight or 60% to 75% by weight, each based on the total weight of the resin solids of the electrodepositable coating composition.

29. The electrodepositable coating composition of any of Aspects 1 to 28, wherein the curing agent is present in an amount of 1% to 60% by weight, such as 10% to 60% by weight or 20% to 50% by weight or 25% to 40% by weight, each based on the total weight of the resin solids of the electrodepositable coating composition.

30. The electrodepositable coating composition of any of Aspects 1 to 29, further comprising water and optionally one or more organic solvents.

31. The electrodepositable coating composition of Aspect 30 comprising water in an amount of 40% to 90% by weight, such as 50% to 75% by weight, based on total weight of the electrodepositable coating composition.

32. The electrodepositable coating composition of any of Aspects 1 to 31 having a total solids content from 1% to 50% by weight, such as 5% to 40% by weight, such as 5% to 35% by weight, based on the total weight of the electrodepositable coating composition.

33. A method of coating a substrate comprising electrophoretically applying the electrodepositable coating composition of any of Aspects 1 to 32 to at least a portion of the substrate and at least partially curing the coating composition to form an at least partially cured coating on the substrate.

34. A substrate coated with a coating deposited from the electrodepositable coating composition of any of Aspects 1 to 32.

35. The method of Aspect 33 or the substrate of Aspect 34, wherein the substrate is non-fibrous.

36. An at least partially cured coating formed by at least partially curing a coating deposited from the electrodepositable coating composition of any of Aspects 1 to 32.

37. Use of the electrodepositable coating composition of any of Aspects 1 to 32 to coat a non-fibrous substrate.

Illustrating the invention are the following examples, which, however, are not to be considered as limiting the invention to their details. Unless otherwise indicated, all parts and percentages in the following examples, as well as throughout the specification, are by weight.

EXAMPLES

Example A: Preparation of a Silicone-based Blocked Polyisocyanate Curing Agent

| Charge | Material | Amount (g) |
|---|---|---|
| 1 | Wacker Fluid NH 40D[1] | 500.0 |
| 2 | Propylene Carbonate | 40.8 |

[1]Polydimethylsiloxane, 3-aminopropyl terminated

A silicone-based blocked polyisocyanate curing agent was formed having the formulation disclosed in Table 1. To prepare the resin, Charge 1 was added to a 4-necked flask fitted with a thermocouple, nitrogen sparge, and a mechanical stirrer. Under a nitrogen blanket and agitation, the flask was heated to 35° C. Charge 2 was then added from an addition funnel over 10 minutes. The reaction was allowed to increase in temperature to 60° C. The reaction was then held at 60° C. for 5 hours. After the hold time was complete, the reaction mixture was cooled to ambient temperature (about 25° C.).

Example B: Preparation of a Silicone-Based Cationic Resinous Dispersion

| Charge | Material | Amount (g) |
|---|---|---|
| 1 | SHIN-ETSU KF-105[1] | 159.9 |
| 2 | SHIN-ETSU KF-8010[2] | 95.5 |
|   | SHIN-ETSU X-22-161B[3] | 330.0 |
| 3 | Curing Agent from Example A | 250.9 |
| 4 | Sulfamic Acid | 19.6 |
|   | Deionized Water | 855.9 |
| 5 | Deionized Water | 846.6 |

[1]Polydimethylsiloxane chain terminated with an epoxy group at both ends of the chain and having an epoxy-equivalent weight of 490 g/mol
[2]Polydimethylsiloxane chain terminated with an amino group at both ends of the chain and having an amine-equivalent weight of 430 g/mol
[3]Polydimethylsiloxane chain terminated with an amino group at both ends of the chain and having an amine-equivalent weight of 1,500 g/mol A silicone-based cationic resinous dispersion was formed having the formulation disclosed in Table 2. To prepare the resin, Charge 1 was added to a 4-necked flask fitted with a thermocouple, nitrogen sparge, and a mechanical stirrer. Under a nitrogen blanket and agitation, the flask was heated to 125° C. Charge 2 was then added to the reactor, and the reactor and held at 125° C. for 4 hours. After the hold time was complete, Charge 3 was added to the reactor and mixed for 15 minutes at 105° C. During the hold, Charge 4 was mixed at room temperature in a separate container equipped with a mechanical stirrer. After the hold, the contents from the reactor were dispersed into the container holding Charge 4 under rapid agitation, and the dispersion was held for 30 minutes. Charge 5 was then added under agitation as the dispersant continued to cool to ambient temperature (about 25° C.).

The solids content from the resulting cationic amine-functionalized resinous dispersion was determined by adding a quantity of the dispersion to a tared aluminum dish, recording the weight of the dispersion and dish, heating the test specimen in the dish for 60 minutes at 110° C. in an oven, allowed the dish to cool, reweighing the dish to determine the amount of non-volatile content remaining, and determining the solids content by dividing the weight of the non-volatile content by the total sample weight and multiplying by 100. This procedure was used to determine the solids content in each of the examples below. The resulting cationic amine-functionalized resinous dispersion had a solids content of 33.41%.

Example C: Preparation of an Electrodeposition Bath Using the Silicone-Based Cationic Resinous Dispersion of Example B In a vessel suitable for electrodeposition, 808 grams of Example B resin was weighed out, and 992 grams of deionized water was slowly added under agitation. The diluted resin/water mixture formed a homogenous, opaque, milky dispersion. The solids content was determined to be 15.0%.

Example D: Electrodeposition of Test Coupons

Zinc phosphated steel test panels having a thickness of 0.81 mm were immersed into the bath of Example C heated to a temperature of 90° F. (32.2° C.). The electrodepositable coating composition was electrodeposited under conditions of 0.5-amp limit, 10 second ramp, and direct current voltages of 150, 200, 250 or 300 volts to produce electrodeposited coatings on the panels. The panels were cured in an oven for 30 minutes at a temperature of 400° F. (204.4° C.). The resulting coated panels had the thicknesses indicated in the table below.

Some of the coated panels were then evaluated for flexibility, impact resistance, adhesion, and solvent resistance.

Flexibility was evaluated using ⅛" conical mandrel bend testing performed according to ASTM D522, method A. The coating exhibited 32% elongation in ⅛" conical mandrel bend testing per ASTM D522, method A, showing no cracking at all.

Reverse impact was evaluated according to ASTM D2794. The coating passed 160 in-pounds reverse impact with no sign of cracking in the stretched area.

Standard tape adhesives including 3M Scotch brand cellophane tape, 3M 898 tape, 3M painter's masking tape, 3M standard duct tape, 3M 4016 two-sided foam tape, and Tesa 4651 were found to exhibit no adhesion at all to the cured coatings.

Solvent resistance was measured according to ASTM D5402. After curing, 50 firm double rubs with an acetone-soaked paper towel did not remove any measurable thickness of the cured film.

The results of the tests are summarized in the table below.

| | Panel: | | | |
|---|---|---|---|---|
| | 1 | 2 | 3 | 4 |
| Current (volts) | 150 | 200 | 250 | 300 |
| Thickness | 0.28 mils (7.11 microns) | 0.36 (9.14 microns) | 0.40 (10.16 microns) | 0.44 (11.18 microns) |
| Cure (minutes/ temperature) | 30'/400° F. (204.4° C.) | 30'/400° F. (204.4° C.) | 30'/400° F. (204.4° C.) | 30'/400° F. (204.4° C.) |
| ⅛" conical mandrel bend testing (ASTM D522, method A) | — | — | 32% elongation (no cracking) | — |
| Reverse impact (ASTM D2794) | — | — | — | 160 in-lbs |
| Solvent Resistance (ASTM D5402) | — | — | 50 Acetone Double Rubs, dulling, no film loss | — |

These results demonstrate that ability to electrodeposit coatings derived from the silicone-based electrodepositable coating compositions disclosed herein. These compositions demonstrated good flexibility, impact resistance, and solvent resistance.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. An electrodepositable coating composition comprising:
a cationic salt group-containing silicone-based main film-forming polymer comprising functional groups and having a number average molecular weight of at least 10,000 g/mol; and
a curing agent reactive with the functional groups of the cationic salt group-containing silicone-based main film-forming polymer, wherein the curing agent comprises an at least partially blocked polyisocyanate, an aminoplast resin, a phenoplast resin, or combinations thereof.

2. The electrodepositable coating composition of claim 1, wherein the cationic salt group-containing silicone-based main film-forming polymer comprises a polydialkylsiloxane polymer, a polydiarylsiloxane polymer, or combinations thereof.

3. The electrodepositable coating composition of claim 1, wherein the cationic salt group-containing silicone-based main film-forming polymer comprises the structure:

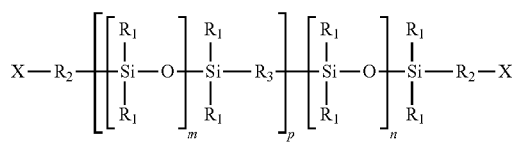

wherein each $R_1$ independently comprises a hydroxyl functional group, an amino functional group, a thiol functional group, an epoxide functional group, an amide functional group, a carbamate functional group, a carboxylic acid group, a phosphorous acid group, a sulfonic acid group, a $C_1$ to $C_4$ alkyl group, or an aryl group comprising an aromatic ring having 6 to 12 carbon atoms in the ring; each $R_2$ is optional and independently comprises oxygen, or a substituted or unsubstituted divalent organic group; each $R_3$ is optional and independently comprises a divalent organic group; each X independently comprises hydrogen, a hydroxyl functional group, an amino functional group, a thiol functional group, an epoxide functional group, an amide functional group, a carbamate functional group, a carboxylic acid group, a phosphorous acid group, a sulfonic acid group, an alkyl group, or an aryl group; m is an integer from 1 to 600; n is an integer from 1 to 600; p is an integer from 0 to 600; and at least a portion of functional groups present in $R_1$, $R_2$, $R_3$, and/or X comprise ionic groups used to form ionic salt groups.

4. The electrodepositable coating composition of claim 3, wherein $R_3$ comprises:

$$\left[\begin{array}{c} H \\ | \\ O \quad H \\ | \quad | \\ -\!\!-\!\!-\!\!-\!\!-\!\!A\!-\!R_4\!-\!\!- \\ | \quad | \\ H \quad H \end{array}\right]$$

wherein A is oxygen or NH and $R_4$ comprises an optional divalent organic group.

5. The electrodepositable coating composition of claim 1, wherein the cationic salt group-containing silicone-based main film-forming polymer comprises the residue of an epoxy-functionalized silicone-based polymer and an amine-functionalized silicone-based polymer.

6. The electrodepositable coating composition of claim 5, wherein the epoxy-functionalized silicone-based polymer has a theoretical epoxy equivalent weight of 100 g/epoxy to 3,000 g/epoxy.

7. The electrodepositable coating composition of claim 5, wherein the amine-functionalized silicone-based polymer has a theoretical amine equivalent weight of 100 g/amine to 2,500 g/amine.

8. The electrodepositable coating composition of claim 5, wherein the ratio of amino functional groups from the amine-functionalized silicone-based polymer to epoxy functional groups from the epoxy-functionalized silicone-based polymer comprises 0.5:1 to 2:1.

9. The electrodepositable coating composition of claim 8, wherein ratio of amino functional groups from the amine-functionalized silicone-based polymer to epoxy functional groups from the epoxy-functionalized silicone-based polymer comprises 1.2:1 to 1.7:1.

10. The electrodepositable coating composition of claim 1, wherein the functional groups of the cationic salt group-containing silicone-based main film-forming polymer comprise active hydrogen functional groups.

11. The electrodepositable coating composition of claim 1, wherein the cationic salt group-containing silicone-based main film-forming polymer comprises an active hydrogen-containing, cationic salt group-containing silicone-based main film-forming polymer.

12. The electrodepositable coating composition of claim 1, wherein the curing agent comprises a silicone-based at least partially blocked polyisocyanate, a silicone-based aminoplast resin, a silicone-based phenoplast resin, or combinations thereof.

13. The electrodepositable coating composition of claim 1, wherein the curing agent comprises a polydimethylsiloxane-based at least partially blocked polyisocyanate.

14. The electrodepositable coating composition of claim 1, wherein the silicone-based main film-forming polymer is present in an amount of 40% to 99% by weight, based on the total weight of resin solids of the electrodepositable coating composition.

15. The electrodepositable coating composition of claim 1, wherein the curing agent is present in an amount of 1% to 60% by weight, based on the total weight of resin solids of the electrodepositable coating composition.

16. The electrodepositable coating composition of claim 1, wherein the electrodepositable coating composition has a total solids content of no more than 50% by weight, based on the total weight of the electrodepositable coating composition.

17. The electrodepositable coating composition of claim 1, wherein of the cationic salt group-containing silicone-based main film-forming polymer is present in an amount of at least 40% by weight, based on the total weight of the resin solids of the electrodepositable coating composition.

18. A method of coating a substrate comprising electrophoretically applying the electrodepositable coating composition of claim 1 to at least a portion of the substrate.

19. A substrate coated with a coating deposited from the electrodepositable coating composition of claim 1.

20. An at least partially cured coating formed by at least partially curing a coating deposited from the electrodepositable coating composition of claim 1.

\* \* \* \* \*